(12) United States Patent
Koberling

(10) Patent No.: US 9,197,850 B2
(45) Date of Patent: Nov. 24, 2015

(54) DISPLAY APPARATUS HAVING A COVER FOR A WEBCAM

(71) Applicant: Fujitsu Technology Solutions Intellectual Property GmbH, München (DE)

(72) Inventor: Toni Koberling, Gräfelfing (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 270 days.

(21) Appl. No.: 13/670,863

(22) Filed: Nov. 7, 2012

(65) Prior Publication Data

US 2014/0028777 A1    Jan. 30, 2014

(30) Foreign Application Priority Data

Nov. 9, 2011    (DE) .......................... 20 2011 107 699

(51) Int. Cl.
*H04N 5/225*    (2006.01)
*H04N 7/14*    (2006.01)
(52) U.S. Cl.
CPC ............. *H04N 7/142* (2013.01); *H04N 5/2251* (2013.01); *H04N 7/147* (2013.01)
(58) Field of Classification Search
CPC ... H04N 5/23245; H04N 5/268; H04N 5/343; H04N 5/225; H04N 5/77
USPC ............ 348/207.99, 211.2, 211.4, 231.4, 344
See application file for complete search history.

(56) References Cited

U.S. PATENT DOCUMENTS

| | | | | |
|---|---|---|---|---|
| 6,256,481 | B1 * | 7/2001 | Jeong et al. ................ | 455/575.3 |
| 6,615,059 | B1 * | 9/2003 | Pehrsson et al. ........... | 455/569.1 |
| 8,242,924 | B2 * | 8/2012 | Huang et al. ............... | 340/686.1 |
| D718,803 | S  * | 12/2014 | Smith et al. .................. | D16/250 |
| 2005/0162508 | A1 | 7/2005 | Basmadjian et al. | |
| 2005/0264649 | A1 | 12/2005 | Chang et al. | |
| 2007/0242948 | A1 * | 10/2007 | Miramontes .................. | 396/448 |
| 2007/0253703 | A1 | 11/2007 | Tsai et al. | |
| 2008/0180568 | A1 * | 7/2008 | Ohnishi et al. ................ | 348/376 |
| 2010/0102979 | A1 * | 4/2010 | Huang et al. ............... | 340/686.1 |
| 2010/0212790 | A1 | 8/2010 | Berry et al. | |
| 2011/0058255 | A1 * | 3/2011 | Weiss ............................. | 359/511 |
| 2011/0099908 | A1 | 5/2011 | Fortmann | |

FOREIGN PATENT DOCUMENTS

| | | | |
|---|---|---|---|
| DE | 20 2004 002 539 U1 | 8/2004 | |
| DE | 20 2009 014628 U1 | 1/2010 | |
| KR | 10-2010-0012516 A | 2/2010 | |

* cited by examiner

*Primary Examiner* — Hung Lam
(74) *Attorney, Agent, or Firm* — DLA Piper LLP (US)

(57) ABSTRACT

A display apparatus for a computer system has a webcam integrated in the display apparatus, a first housing portion having a recording opening for the webcam and an opaque second housing portion movably connected to the first housing portion, wherein the second housing portion covers the recording opening in a first position and exposes the recording opening in a second position.

20 Claims, 3 Drawing Sheets

DISPLAY APPARATUS HAVING A COVER FOR A WEBCAM

The invention relates to a display apparatus, particularly a flat screen for a computer system, having an integrated webcam.

Such display apparatus are known from the prior art. In particular as a result of the increasing spread of video communication, flat screens and laptop displays in computer systems more and more frequently have a built-in digital camera, usually called a webcam.

Webcams allow a multiplicity of novel applications, such as particularly video telephony, or the recording of simple images or videos, of the user of a computer system. The use of webcams also harbors risks, however, particularly in respect of unauthorized recording and observation of a user, for example by malicious software.

In order to avoid unnoticed use of camera, known webcams usually have a light-emitting diode which lights as soon as the webcam has been activated by a piece of software. However, such a status indicator can also be manipulated by a malicious software component.

It is an object of the present invention to describe an improved display apparatus of the type cited at the outset. In particular, a user of the display apparatus is intended to be able to prevent unnoticed or unauthorized activation of an integrated webcam.

The aforementioned object is achieved by a display apparatus having a webcam integrated in the display apparatus. In this case, the display apparatus has a first housing portion having a recording opening for the webcam and an opaque second housing portion which is movably connected to the first housing portion. The second housing portion covers the recording opening in a first position and exposes the recording opening in a second position.

Covering a recording opening for a webcam allows unauthorized observation or recording of a user to be prevented in a simple, mechanical manner.

In various refinements, the display apparatus has additional switching elements for interrupting electrical lines for connecting the webcam or further components. In this case, the switching elements are mechanically coupled to the second housing portion, with transmission of signals being prevented in the first position by the switching elements being opened.

The display apparatus described is particularly suitable for use in a computer system, such as a computer system having an integrated display apparatus.

In one preferred refinement, the computer system is set up to execute a program for processing image data from the webcam when the second housing portion moves into the second position.

Figure 1:
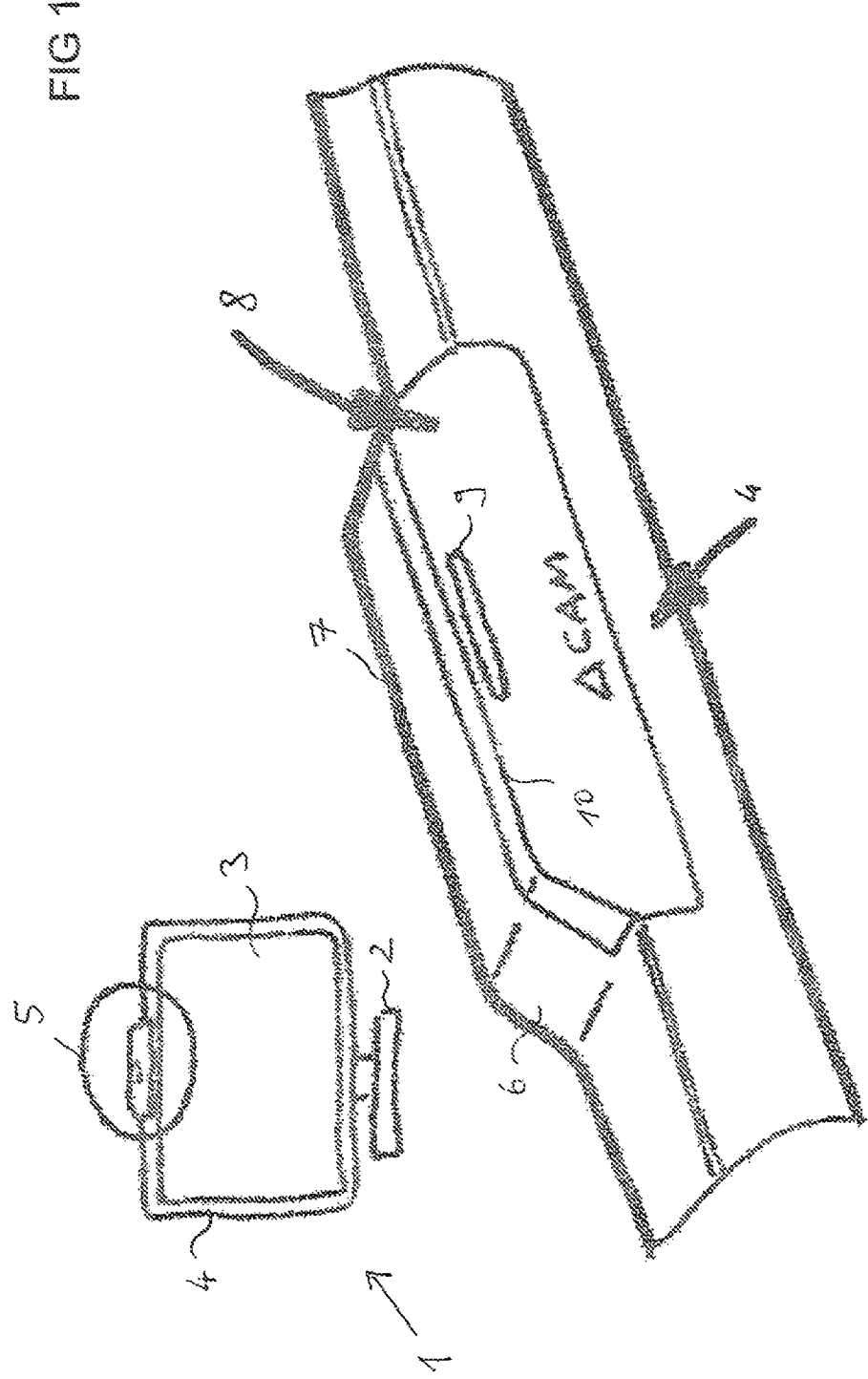
Figure 2:
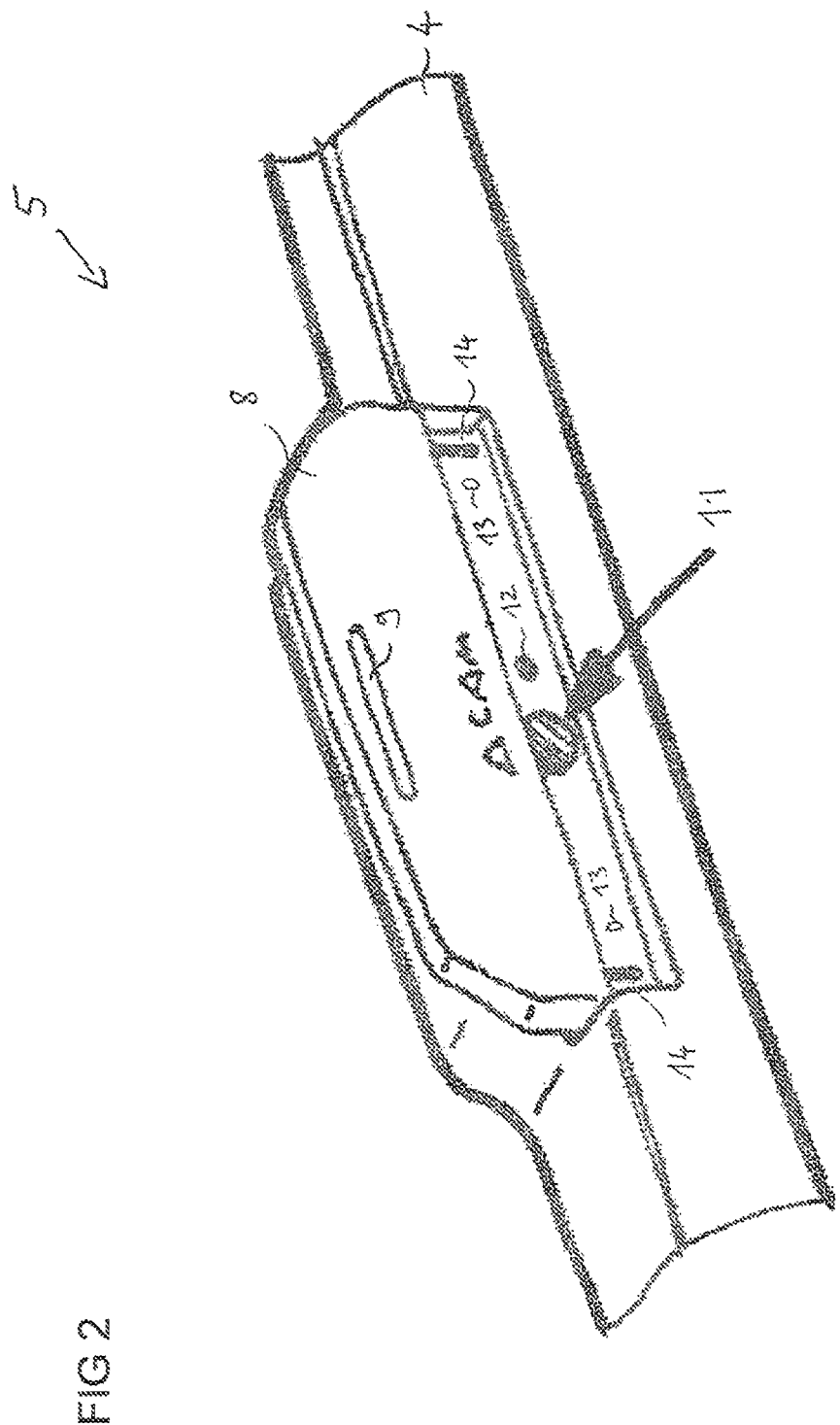
Figure 3:
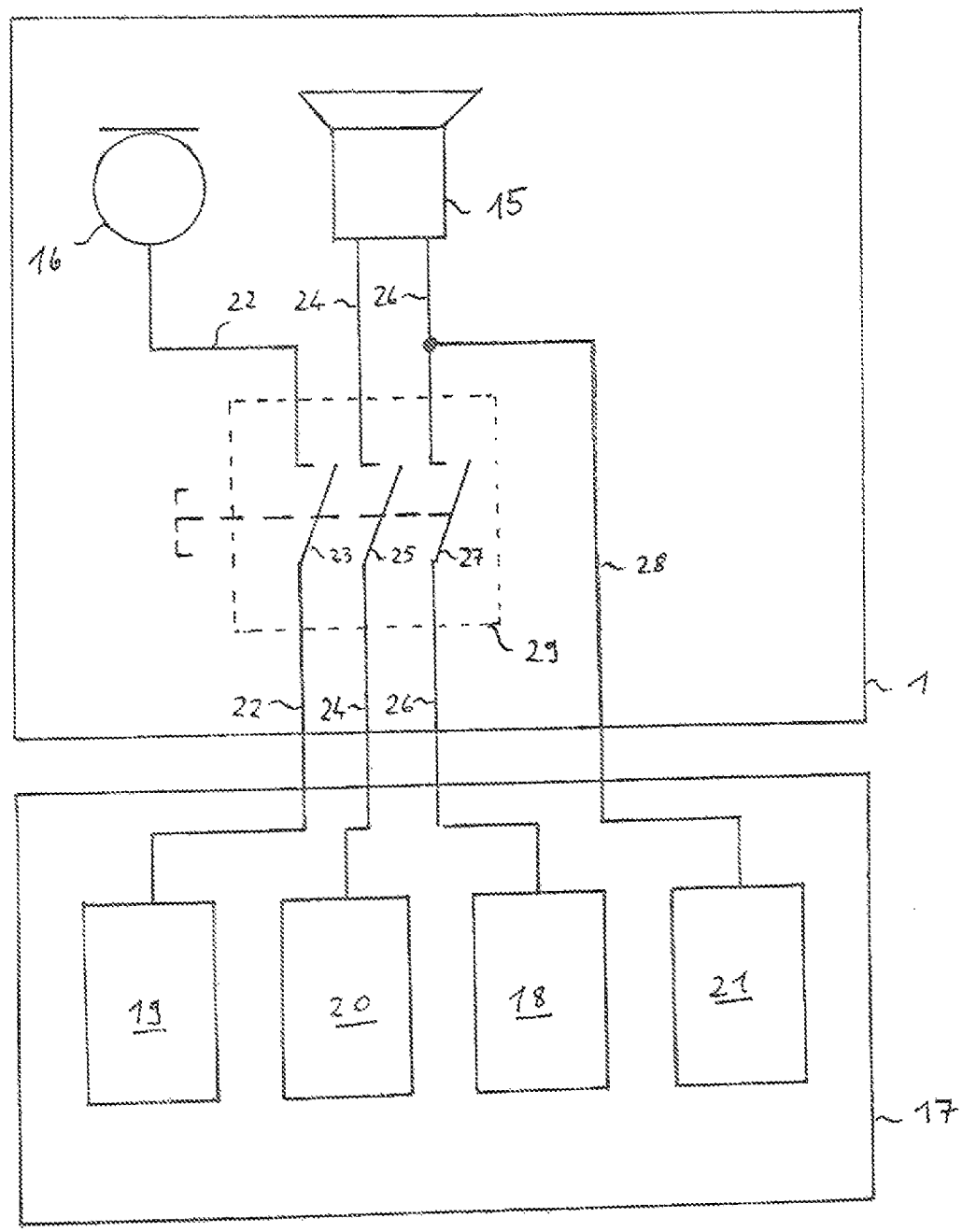

Further advantageous refinements of the invention are disclosed in the appended patent claims and in the detailed description below. The invention is explained below using exemplary embodiments with reference to the figures, in which:

FIG. 1 shows a display apparatus based on a first refinement in a first position, FIG. 2 shows the display apparatus based on the first refinement in a second position, and FIG. 3 shows an illustration of a wiring diagram for a display apparatus based on a second refinement.

The top left-hand portion of FIG. 1 shows a display apparatus 1, for example a flat screen in a computer system, or a display apparatus in a video conference system. The display apparatus 1 comprises a base 2, a display panel 3, for example an LCD or TFT display, and a frame 4. The frame 4 surrounds the display panel 3 and at the same time forms a first housing portion of the display apparatus 1.

The bottom right hand portion of FIG. 1 shows a top extract 5 from the frame 4 in detail. In the exemplary embodiment shown, the center of the top region of the frame 4 has an elevation 6 which terminates in a top housing edge 7. Arranged on the front of this housing portion is a slider 8 which forms a second housing portion of the display apparatus 1. In the exemplary embodiment shown, the slider 8 comprises a grip strip 9 for pulling out the slider 8 upward.

FIG. 1 shows the slider 8 in a first, closed state. In this state, a top edge 10 of the slider 8 terminates flush with the housing edge 7 of the frame 4. The slider 8 bears a legend which indicates that a webcam is arranged behind the slider 8.

FIG. 2 shows the extract 5 shown in FIG. 1 in a second state. In comparison to the first state, the slider 8 has been taken upwards into an open position by pulling on the grip strip 9. In this state, the slider 8 exposes a recording opening 11 with a webcam lens encased therein. In the exemplary embodiment shown in FIG. 2, the webcam itself is arranged on a printed circuit board of the display apparatus 1 and therefore cannot be seen in the illustration.

Furthermore, FIG. 2 reveals that an indicator element 12 in the form of a light-emitting diode is arranged next to the recording opening 11. The indicator element 12 lights when the webcam is activated by a piece of software. Hence, the indicator element 12 additionally indicates to a user that the webcam is recording or ready to record.

Additionally, two microphone openings 13 for a stereo microphone are arranged behind the slider 8. The microphone openings 13 are also exposed only after the slider 8 has been pulled up and are otherwise covered by the slider 8. Covering the microphone openings 13 in the closed state as shown in FIG. 1 preferably brings about sound attenuation to such an extent that even loud utterances by a user cannot be picked up by the microphones behind the microphone openings 13, or can be picked up with only inadequate sound quality. By way of example, elastic foam elements may be arranged on the back of the slider 8.

As is evident from FIG. 2, the slider 8 extends in a horizontal direction over the entire width of the elevation 6 and hence from the left-hand microphone opening 13 via the recording opening 11 and the indicator element 12 until it is over the right-hand microphone opening 13. In FIG. 2, it can be seen that the slider 8 is guided along two rails 14 in a vertical direction, with the result that a displacement path that is as short as possible allows the slider 8 to cover all functional elements for the video communication. By contrast, the slider is of relatively slender design in the horizontal direction, with the result that, particularly in the state shown in FIG. 1, it terminates flush with the contours of the frame 4 of the display apparatus 1.

FIG. 3 shows a simplified diagram for the connection of a webcam to a computer system based on a further requirement of the invention. By way of example, this may be an internal wiring diagram for a laptop or for what is known as an all-in-one PC, or may be a wiring diagram for a monitor which is independent of the computer system.

FIG. 3 reveals that a webcam 15 and a microphone 16 of a display apparatus 1 are coupled to various components of a computer system 17. In the exemplary embodiment, the computer system 17 comprises a power supply component 18, an audio component 19, a video component 20 and an evaluation component 21.

A first electrical line 22 for connecting the microphone 16 is connected to the audio component 19 via a switching element 23. A second electrical line 24 for connecting the webcam 15 is connected to the video component 20 via a second switching element 25. A third electrical line 26 connects the power supply component 18 to the webcam 15. The third electrical line 26 can be interrupted by means of a third switching element 27. A fourth electrical line 28 is used to tap off the supply voltage for the webcam 15 downstream of the third switching element 27 and to route it back to the evaluation component 21. The three switching elements 23, 25 and 27 form different switching contacts of a three-pole switch 29 in the exemplary embodiment.

The switch 29 is mechanically coupled to a movable housing portion, for example the slider 8 based on the exemplary embodiment in FIGS. 1 and 2. When the slider 8 is moved into an open position, particularly the position shown in FIG. 2, the switching elements 23, 25 and 27 are closed, with the result that the webcam 15 and the microphone 19 are connected to the relevant components of the computer system 1. Conversely, the switching elements 23, 25 and 27 are interrupted when the slider 8 is put in the closed position shown in FIG. 1, with the result that the webcam 15 and the microphone 16 are also electrically isolated from the relevant evaluation components of the computer system 1.

The position of the movable housing portion can be ascertained by the evaluation component 21 by means of the fourth electrical line 28 and can be used, by way of example, to automatically start an associated piece of software, for example, a piece of video conference software in the computer system 17, when the slider 8 is opened. In this case, the provision of the operating voltage serves as a control signal which indicates to the evaluation component 21 that the slider 8 is open.

The various refinements described allow unintentional or unauthorized use of a webcam 15 and components connected thereto to be safely and effectively prevented by a user. In this case, the functional state of the webcam 15 is signaled firstly by the position of the slider 8 and optionally additionally by the lighting of the indicator element 12.

In this case, neither the mechanical block by the slider 8 nor the optional, additional electrical interruption by the switching elements 23, 25 and 17 can be overcome by malware which is executed by the computer system 17.

LIST OF REFERENCE SYMBOLS

1 Display apparatus
2 Base
3 Display panel
4 Frame
5 Extract
6 Elevation
7 Housing edge
8 Slider
9 Grip strip
10 Top edge
11 Recording opening
12 Indicator element
13 Microphone opening
14 Rail
15 Webcam
16 Microphone
17 Computer system
18 Power supply component
19 Audio component
20 Video component
21 Evaluation component
22 First electrical line
23 First switching element
24 Second electrical line
25 Second switching element
26 Third electrical line
27 Third switching element
28 Fourth electrical line
29 Switch

The invention claimed is:

1. A computer system having a display apparatus comprising:
   a webcam integrated in the display apparatus;
   a first housing portion of the display apparatus having a recording opening for the webcam;
   an opaque second housing portion movably connected to the first housing portion, of the display apparatus, wherein the second housing portion covers the recording opening in a first position and exposes the recording opening in a second position;
   at least one electrical line that connects the display apparatus to a component of the computer system; and
   at least one switching element that interrupts the at least one electrical line, wherein the at least one switching element is mechanically coupled to the second housing portion such that in the first position transmission of a signal via the at least one electrical line is prevented by the at least one switching element being opened.

2. The computer system according to claim 1, wherein the display apparatus has at least one microphone having a microphone opening which is arranged in the first housing portion, and the second housing portion covers the microphone opening in a first position and exposes the microphone opening in a second position.

3. The computer system according to claim 1, wherein the at least one electrical switching element interrupts at least one sound signal, an image signal, a supply voltage or a control signal.

4. The computer system according to claim 1, that executes a program that processes image data from the webcam when the second housing portion moves into the second position.

5. A display apparatus comprising:
   a webcam integrated in the display apparatus;
   a first housing portion having a recording opening for the webcam;
   an opaque second housing portion movably connected to the first housing portion, wherein the second housing portion covers the recording opening in a first position and exposes the recording opening in a second position;
   at least one microphone;
   at least one first electrical line that connects the microphone to an audio component; and
   a first switching element that interrupts the at least one first electrical line,
   wherein the first switching element is mechanically coupled to the second housing portion such that in a first position transmission of a sound signal from microphone of the audio component is prevented by the first switching element being opened,
   the first housing portion forms part of a frame for a display panel, and the second housing portion terminates flush with an upper housing edge of the frame in the first position and projects above the upper housing edge in a second position.

6. The display apparatus according to claim 5, wherein the at least one microphone has a microphone opening arranged in the first housing portion, and the second housing portion covers the microphone opening in the first position and exposes the microphone opening in the second position.

7. The display apparatus according to claim 5, further comprising:
   at least one second electrical line that connects the webcam to a video component; and
   a second switching element that interrupts the at least one second electrical line,
   wherein the second switching element is mechanically coupled to the second housing portion such that in the first position transmission of an image signal from the webcam to the video component is prevented by the second switching element being opened.

8. The display apparatus according to claim 5, further comprising:
   at least one third electrical line that connects the webcam to a power supply component; and
   a third switching element that interrupts the at least one third electrical line,
   wherein the third switching element is mechanically coupled to the second housing portion such that in the first position a supply of power to the webcam is interrupted by the third switching element being opened.

9. The display apparatus according to claim 5, further comprising:
   at least one fourth electrical line that signals a position of the second housing portion to an evaluation component,
   wherein a switching element is mechanically coupled to the second housing portion such that a control signal for the position of the second housing portion is provided for the evaluation component.

10. The display apparatus according to claim 5, further comprising:
    at least one indicator element that indicates an operating state of the webcam,
    wherein the second housing portion covers the indicator element in the first position and exposes the indicator element in the second position.

11. The display apparatus according to claim 5, integrated in a computer system.

12. The display apparatus according to claim 11, wherein the computer system executes a program to process image data from the webcam when the second housing portion moves into the second position.

13. The display apparatus according to claim 11, in the form of a flat screen in the computer system.

14. A display apparatus comprising:
    a webcam integrated in the display apparatus;
    a first housing portion having a recording opening for the webcam;
    an opaque second housing portion movably connected to the first housing portion, wherein the second housing portion covers the recording opening in a first position and exposes the recording opening in a second position;
    wherein the first housing portion forms part of a frame for a display panel and the second housing portion terminates flush with an upper housing edge of the frame in the first position and projects above the upper housing edge in a second position.

15. The display apparatus according to claim 14, further comprising:
    at least one electrical line that connects the display apparatus to a component of a computer system; and
    at least one switching element that interrupts the at least one electrical line,
    wherein the at least one switching element is mechanically coupled to the second housing portion such that in a first position transmission of a signal via the at least one electrical line is prevented by the at least one switching element being opened.

16. The display apparatus according to claim 15, wherein the at least one electrical line comprises a third electrical line that connects the webcam to a power supply component of the computer system; and the at least one electrical switching element comprises a third switching element that interrupts the at least one third electrical line such that in the first position a supply of power to the webcam is interrupted by the third switching element being opened.

17. The display apparatus according to claim 15, wherein the at least one electrical line comprises a fourth electrical line that signals a position of the second housing portion to an evaluation component of the computer system such that a control signal for the position of the second housing portion is provided for the evaluation component.

18. The display apparatus according to claim 17, wherein the evaluation component executes a program that processes image data from the webcam when the second housing portion moves into the second position.

19. The display apparatus according to claim 15, wherein the at least one electrical line comprises a first electrical line that connects a microphone of the display apparatus to an audio component of the computer system; and
    the at least one electrical switching element comprises a first switching element that interrupts the at least one first electrical line such that in the first position transmission of a sound signal from the microphone to the audio component is prevented by the first switching element being opened.

20. The display apparatus according to claim 15, wherein the at least one electrical line comprises a second electrical line that connects the webcam to a video component of the computer system; and
    the at least one electrical switching element comprises a second switching element that interrupts the at least one second electrical line such that in the first position transmission of an image signal from the webcam to the video component is prevented by the second switching element being opened.

* * * * *